(12) United States Patent
Torimoto et al.

(10) Patent No.: US 7,381,465 B2
(45) Date of Patent: Jun. 3, 2008

(54) CORE-SHELL STRUCTURE HAVING CONTROLLED CAVITY INSIDE AND STRUCTURE COMPRISING THE CORE-SHELL STRUCTURE AS COMPONENT, AND METHOD FOR PREPARATION THEREOF

(75) Inventors: Tsukasa Torimoto, Hokkaido (JP); Bunsho Ohtani, Hokkaido (JP); Kentaro Iwasaki, Hokkaido (JP)

(73) Assignee: Japan Science and Technology Agency, Saitama (JP)

( * ) Notice: Subject to any disclaimer, the term of this patent is extended or adjusted under 35 U.S.C. 154(b) by 38 days.

(21) Appl. No.: 10/505,542

(22) PCT Filed: Feb. 17, 2003

(86) PCT No.: PCT/JP03/01651

§ 371 (c)(1), (2), (4) Date: Aug. 23, 2004

(87) PCT Pub. No.: WO03/072488

PCT Pub. Date: Sep. 4, 2003

(65) Prior Publication Data

US 2005/0082521 A1   Apr. 21, 2005

(30) Foreign Application Priority Data

Feb. 27, 2002   (JP) .............................. 2002-052395

(51) Int. Cl.
B32B 5/16 (2006.01)
B05D 7/00 (2006.01)
(52) U.S. Cl. ...................... 428/403; 427/215; 977/775; 977/777; 977/824

(58) Field of Classification Search ................ 427/212, 427/215; 428/402, 403, 405; 977/775, 777, 977/824
See application file for complete search history.

(56) References Cited

U.S. PATENT DOCUMENTS 3,654,526 A * 4/1972 Cunningham et al. ...... 257/763

FOREIGN PATENT DOCUMENTS

EP    0 726 228 A1    8/1996
EP    1479649 A1 *    11/2004

OTHER PUBLICATIONS

Mulvancey et al., Silica encapsulation of quantum dots and metal clusters, Journal of Material Chemistry, vol. 10, pp. 1259-1270, 2000.*

(Continued)

*Primary Examiner*—H. T Le
(74) *Attorney, Agent, or Firm*—Westerman, Hattori, Daniels & Adrian, LLP.

(57) ABSTRACT

A core-shell structure comprises a core (2) comprising nanoparticles and a shell (4) coating the core (2), and its void space (3) formed by the core (2) and the shell (4) is controlled. A method of preparing the core-shell structure comprises: forming particles comprising a photoetchable semiconductor, metal or polymer and coating the particles with a shell (4) comprising a non-photoetchable semiconductor, metal or polymer, to form a core-shell structure (5); and irradiating the core-shell structure with a light having a controlled wavelength in the photoetching solution to form an adjustable void space inside a shell (3) within the core-shell structure by the size-selective photoetching method. The core-shell structure allows the preparation of a catalyst exhibiting an extremely high efficiency, and can be used as a precursor for preparing a nanomaterial required for a nanodevice.

29 Claims, 7 Drawing Sheets

OTHER PUBLICATIONS

Chang et al., Creation of Templated Complex Topological Morphologies in Colloidal Silica, Journal of American Chemical Society, vol. 116, pp. 6745-6747, 1994.*

Wang et al., "Void formation during early stages of passivation: Initial oxidation of iron nanoparticles at room temperature", J. of Applied Physics 98, 094308, 1-7, (2005).*

Pal, Torimoto, Iwasaki, Shibayama, Takahashi, and Ohtani, "Synthesis of Metal-Cadmium Sulfide Nanocomposites Using Jingle-Bell-Shaped Core-Shell Photocatalyst Particles", pp. 1-21 (~2003).*

Notification of Transmittal of Copies of Translation of the International Preliminary Examination Report dated Sep. 23, 2004 and received by our foreign associate on Sep. 27, 2004.

Yadong Yin et al.; American Chemical Society, Chemistry of Materials, vol. 13, No. 4, pp. 11-46-1148, 2001. Cited in the PCT search report.

Tsukasa Torimoto et al.; American Chemical Society, Journal of Physical Chemistry B, vol. 105, No. 29, pp. 6838-6845, Jul. 26, 2001. Cited in the PCT search report.

Tsukasa Torimoto et al.; American Chemical Society, Journal of the American Chemical Society, vol. 125, No. 2, pp. 316-317, Jan. 15, 2003. Cited in the PCT search report.

* cited by examiner

CORE-SHELL STRUCTURE HAVING CONTROLLED CAVITY INSIDE AND STRUCTURE COMPRISING THE CORE-SHELL STRUCTURE AS COMPONENT, AND METHOD FOR PREPARATION THEREOF

TECHNICAL FIELD

The present invention relates to a core-shell structure used for catalysts, electron device materials, and the like, and more particularly relates to a core-shell structure having an adjustable void space inside a shell.

BACKGROUND ART

Porous materials are widely used for catalysts, adsorbents, surface active agents, and the like. A porous material is a material having micropores of a certain shape, and, among them, a porous material having micropores the diameter of which is 2 nanometer (hereinafter the abbreviated term nm to be used) or less is called a microporous material, and that the diameter of which is 2-50 nm is called a mesoporous material. As a microporous material, for example, zeolite is well known. Zeolite is a crystalline material in which such metal atoms as Si and Al are bonded via oxygen, having micropores of a certain shape, and is used, by utilizing said micropores, for example, as a cracking catalyst to crack heavy oil to gasoline, or as a molecular sieve adsorbent not passing branched alkanes but passing linear alkanes only.

Further in the recent years, the porous material having larger void, that is, the mesoporous material is proposed for improvement of catalytic function and realization of a new function, and the preparation of mesoporous materials consisting of metal oxides such as silica is widely studied. The mesoporous material represented by mesoporous silica is prepared by forming metal oxide thin film around the template which is self-organized organic molecule aggregate such as surface active agent micelles and inorganic or organic nanoparticles, and removing said template. The pore structure of mesoporous material can be controlled by controlling the size and arrayed structure of the material used for a template, and mesoporous materials with randomly dispersed mesopores, those with regularly arrayed mesopores, or those with spherical mesopores regularly arrayed in three dimension, and many others have been realized.

Although mesoporous materials have no regularity on atomic level, they are the crystals of new type so far not existent in which the voids of mesoscale are regularly arrayed, and are expected hereafter in the active role as industrial materials as adsorbing and separating materials (the materials to adsorb specific molecules in voids and separate them), catalysts, and surface active agents. Their applications in various fields are anticipated very much such as utilization as new electron device materials by introducing the aggregate of various atoms and molecules into voids.

Here, the size of a void formed between a nanoparticle and a mesopore enclosing it is quite important as the quantity to characterize the space of chemical reaction for catalytic reactions and material syntheses, and the fields of material adsorption or material enclosing. That is, it is predictable that a structure having an adjustable void space near a nanoparticle, and the structure having as a constituent said structure can be a catalyst of extremely high efficiency compared with conventional catalysts, can give the selectivity of chemical species involved in chemical reaction, can be a catalyst for the chemical reaction for which no catalyst has so far been available, or can be used as the basis for preparation of a nanomaterial required for nanodevice.

For example, since the photocatalytic reaction takes place on the surface of photocatalyst such as titanium oxide, many studies have been made to realize the photocatalyst of high efficiency by increasing the surface area by converting photocatalyst to a nanoparticle. However, since nanoparticles coagulate by Van der Waals force, the chemical species involved in catalytic reaction cannot be adsorbed on a nanoparticle, thereby an expected result cannot be realized. That is, a photocatalyst of high efficiency cannot be realized because an adjustable void space does not exist near a nanoparticle.

If a void space can be made near a nanoparticle, then the chemical species involved in catalytic reaction can be adsorbed on a catalyst nanoparticle, and a photocatalyst of high efficiency can be realized. If also the size of a void space near a nanoparticle can be controlled, in another word, if an adjustable void space can be formed near a nanoparticle, then the molecular species to be adsorbed can be controlled, thereby the selectivity of chemical species involved in catalytic reaction can be realized. Since also the structure having as a constituent a structure having an adjustable void space near a nanoparticle can array specific molecular species based on the shape of structure, it can be the catalyst for the chemical reaction for which no catalyst has so far been available, and can be used as the basis to prepare the nanomaterial required for nanodevice.

The conventional porous material having a void space near a nanoparticle is the combination of a mesoporous material and a nanoparticle made of a metal or a semiconductor. The conventional method to form a nanoparticle inside mesoporous material is to introduce the reactive gas as the starting material for a nanoparticle into mesoporous material, let it react and decompose, and to have a nanoparticle grow inside the micropore of mesoporous material. However, in the nanoparticle-mesoporous material complex prepared by said method, the particle diameter of a nanoparticle differs by the location inside mesoporous material, and therefore it is quite difficult to control particle diameter. For this reason, it is extremely difficult by the prior art to prepare porous material having the controlled nano void space near a nanoparticle. In other words, it has been difficult by the prior art to prepare the structure having the controlled nano void space near a nanoparticle, and structures having said structure as a constituent unit.

DISCLOSURE OF THE INVENTION

The object of the present invention is, taking into consideration the problem mentioned above, to provide a core-shell structure having an adjustable void space inside a shell and a structure having the same as a constituent and a method of preparation the same.

In order to solve the problem mentioned above, the core-shell structure having an adjustable void space inside a shell of the present invention is characterized in that it comprises: a core comprising nanoparticles; a shell coating said core; and a void space made up of said core and shell, and said void space inside a shell is controlled.

Said shell preferably has an opening with a predetermined shape.

Said core preferably comprises a photoetchable solid, and said solid comprises a metal, a metal oxide, a semiconductor, or a polymer having a photoabsorption edge.

Said shell preferably comprises a non-photoetchable material.

Said core is also preferably metal chalcogenide semiconductor fine particle, and said shell is a film having silicon-oxygen bond in its structure.

Also preferably, metal chalcogenide semiconductor fine particle is CdS (cadmium sulfide), and the film having silicon-oxygen bond in its structure is SiOx (silicon oxide, 0<x).

Said core-shell structure is a porous material having near a nanoparticle the optimally adjustable void space inside a shell as the chemical reaction space for specific catalytic reactions, or material syntheses, or as the field for adsorption or enclosing of a specific material. And specific catalytic reactions, or material syntheses, or adsorption or enclosing of a specific material can be conducted highly efficiently and selectively therein.

Also, the structure having as a constituent a core-shell structure with an adjustable void space inside a shell of the present invention is characterized to be a structure having said core-shell structure as a constituent. Since said structure has a core-shell structure having an adjustable void space inside a shell as a constituent, it is also capable, in addition to the effect of a core-shell structure, of applying the void as catalytic reactions, material syntheses, adsorption or enclosing of specific materials in still wider range based on the shape of a structure.

Still further, the method of preparation of a core-shell structure having an adjustable void space inside a shell in accordance with the present invention is characterized in that: a particle comprising a photoetchable solid is prepared while its particle diameter is controlled; a particle surface is chemically modified with a chemical material containing a component element capable of bonding to said particle surface and a group containing a component element of non-photoetchable oxide, thereby said group is introduced into said particle surface; a coating film made of said oxide is formed by hydrolyzing said group containing a component element of non-photoetchable oxide; a core-shell structure is formed with said particle as a core, and said coating film as a shell; said core-shell structure is photo-irradiated in a photoetching solution of controlled wavelength; and an adjustable void space is formed inside the core-shell structure. According to this method, a core-shell structure having an adjustable void space inside a shell can be prepared.

Preferably in said composition, upon said chemical modification, the coating film is formed by competitively bonding said group containing a component element of the coating film and a compound not reactive with said group containing a component element of the coating film to said particle surface, and the opening of the desired shape is formed in said shell by oxidative dissociation of said compound, after forming an adjustable void space inside the core-shell structure. According to this method, a core-shell structure having an adjustable void space inside a shell, and having an opening of a predetermined shape can be prepared.

Also in said composition, the core-shell structure having an adjustable void space inside a shell that can be dissolved in water or organic solvents can be prepared by after the hydrolysis and further chemical modification by adding a chemical material having a hydrophilic or hydrophobic group.

Said particle comprising a photoetchable solid is, for example, CdS (cadmium sulfide), the element to bond to the particle surface is S (sulfur), the component element of non-photoetchable oxide is Si (silicon), the group is $(CH_3O)_3$ Si— (trimethoxysilyl) group containing Si, the chemical material is $(CH_3O)_3Si(CH_2)_3SH$ (3-mercaptopropyltrimethoxysilane), and the coating film formed by hydrolysis is SiOx (silicon oxide, 0<x). In this case, the core made of CdS nanoparticle with controlled particle diameter is formed and the shell made of SiOx film coating the core via adjustable void space is formed. The shell thickness is thin enough so that solute and solvent can pass.

Also, the particle comprising photoetchable solid is, for example, CdS (cadmium sulfide), the element bonding to the particle surface is S (sulfur), the component element of non-photoetchable oxide is Si, the group is $(CH_{3O})_3Si$—(trimethoxysilyl) group containing Si, the chemical material is $(CH_3O)_3Si(CH_2)_3SH$ (3-mercaptopropyltrimethoxysilane), and the compound not reactive with the group containing the component element of the coating film may be a thiol compound such as alkylthiols. In this case, the core made of CdS nanoparticle with controlled particle diameter is formed and the shell made of SiOx film coating the core via an adjustable void space is formed. The opening of predetermined shape is formed in the shell, and is capable of passing solute and solvent selectively.

Also, the particle comprising a photoetchable solid is, for example, CdS (cadmium sulfide), the element bonding to the particle surface is S (sulfur), the component element of non-photoetchable oxide is Si, the group is $(CH_3O)_3Si$—(trimethoxysilyl) group containing Si (silicon), the chemical material is $(CH_3O)_3Si(CH_2)_3SH$ (3-mercaptopropyltrimethoxysilane), the chemical material having a hydrophilic group is an alkylsilane containing either carboxylic, quaternary ammonium, amino, sulfonic acid, or hydroxyl group, and the chemical material having a hydrophobic group is an n-octadecyltrimethoxysilane. In this case, the core made of CdS nanoparticle with controlled particle diameter is formed and the shell made of SiOx film coating the core via an adjustable void space is formed. A predetermined functional group is introduced in the shell, thereby soluble in a desired solvent.

Forming of an adjustable void space inside a core-shell structure by said photo-irradiation with controlled wavelength, the particle diameter is controlled by photoetching with the light of wavelength of absorption edge corresponding to said predetermined particle diameter. By this method, the core of the core-shell structure absorbs the light to be photoetched, and its particle diameter is reduced. With the reduced particle diameter, the wavelength of absorption edge of a core moves to the shorter wavelength side by quantum size effect, and the core becomes non-photoetchable if the wavelength of absorption edge of the core becomes shorter than the wavelength of the irradiated light. By selecting the wavelength of the irradiated light, the particle diameter can be made to the predetermined size. Since the particle diameter can be made to the predetermined size, a core-shell structure having an adjustable void space inside a shell can be prepared.

Further, an embodiment of the method of preparation of a structure having as a constituent a core-shell structure with an adjustable void space inside a shell of the present invention is characterized in that a plurality of core-shell structure having a adjustable void space inside a shell prepared by any one of the above-described methods are dispersed in solvent, and are self-organized by gradually evaporating said solvent, and the structure having as a constituent said core-shell structure is formed.

Also, another embodiment of the method of preparation of a structure having as a constituent a core-shell structure with an adjustable void space inside a shell of the is characterized in that, a plurality of core-shell structure having an adjustable void space inside a shell prepared by any one of the above-described methods are spread on the gas-liquid interface, and thus formed two dimensional film of said core-shell structure is compressed and self-organized.

Also, still another embodiment of the method of preparation of a structure having as a constituent a core-shell structure with an adjustable void space inside a shell of the present invention is characterized in that a plurality of core-shell structure having an adjustable void space inside a shell prepared by any one of the above-described methods are aligned with DNA as a template.

Also, still another embodiment of a method of preparation of a structure having as a constituent a core-shell structure with an adjustable void space inside a shell of the present invention is characterized in that: a plurality of core-shell structures comprising the particle made of a photoetchable solid, and a non-photoetchable film coating said particle surface are dispersed in solvent; said plurality of core-shell structures are self-organized by gradually evaporating solvent; and a light of wavelength of absorption edge corresponding to the predetermined diameter of said particle is irradiated to said self-organized core-shell structure in the photoetching solution, thereby photoetching to form the desired void.

Also, still another embodiment of a method of preparation of a structure having as a constituent a core-shell structure with an adjustable void space inside a shell of the present invention is characterized in that: a plurality of core-shell structures comprising a particle made of a photoetchable solid and a non-photoetchable film coating said particle surface is spread on the gas-liquid interface, thus formed two dimensional film comprising said core-shell structure is compressed and organized; and a light of wavelength of absorption edge corresponding to the predetermined diameter of said particle is irradiated to said self-organized core-shell structure in a photoetching solution, thereby photoetching to form the desired void.

Still another embodiment of a method of preparation of a structure having as a constituent a core-shell structure with an adjustable void space inside a shell of the present invention is characterized in that: a plurality of core-shell structures comprising a particle made of a photoetchable solid, and a non-photoetchable film coating said particle surface is arranged with DNA as template; and a light of wavelength of absorption edge corresponding to the predetermined diameter of said particle is irradiated to said arranged core-shell structure in the photoetching solution, thereby photoetching to form the desired void.

According to the method described above, a structure having as a constituent a core-shell structure with an adjustable void space inside a shell can be prepared.

BRIEF DESCRIPTION OF THE DRAWINGS

The present invention will be better understood referring to the detailed explanation below and the attached figures illustrating several embodiments of the present invention. Here the embodiments illustrated in the attached figures are intended by no way to specify or limit the present invention, but are shown solely to facilitate explanation and understanding of the present invention. In the figures.

BEST MODES FOR CARRYING OUT THE INVENTION

Hereafter, the embodiment of the present invention will be explained in detail referring to the figures. Here, explanation is made with the same symbols and marks assigned to the practically same parts.

Figure 1:
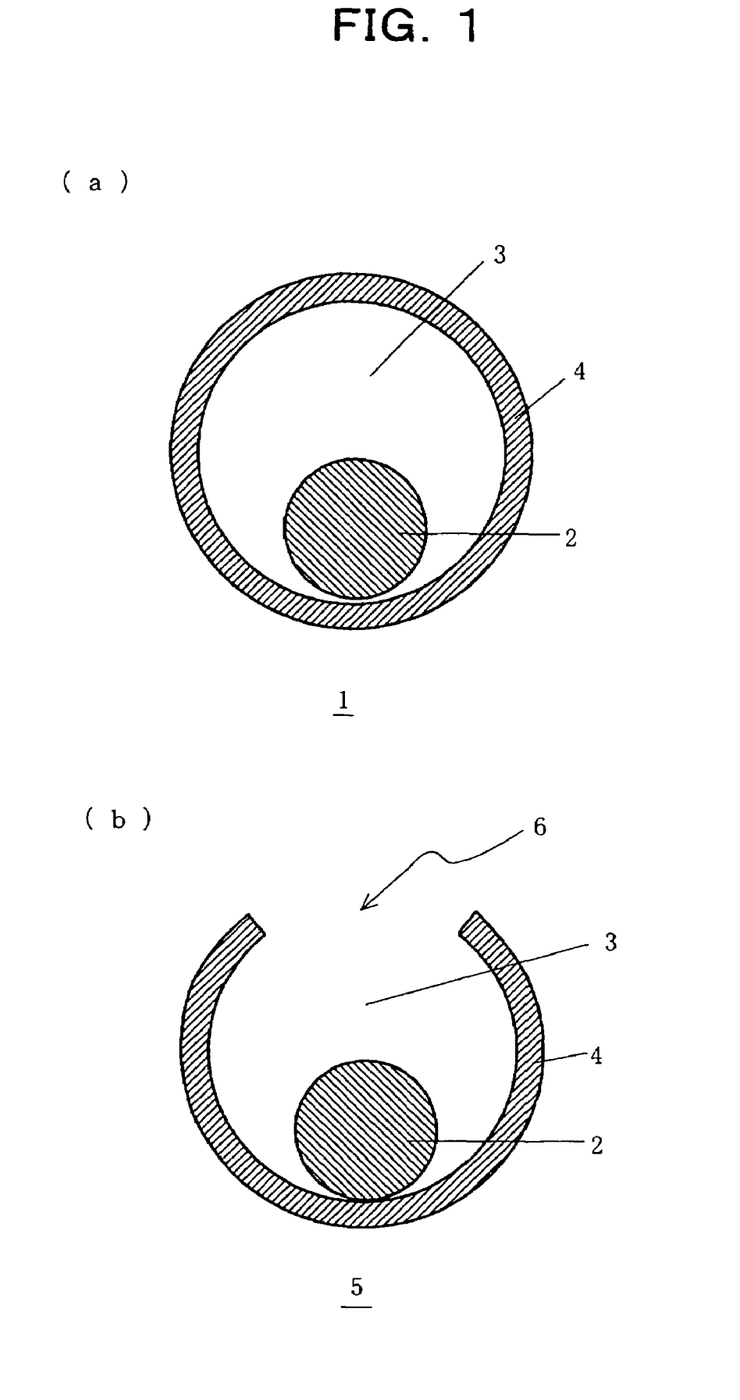
FIG. 1 is an illustrative cross sectional view showing a composition of a core-shell structure having an adjustable void space inside a shell of the present invention.

FIG. 1 is an illustrative cross sectional view showing the structure of a core-shell structure having an adjustable void space inside a shell of the present invention. As shown in FIG. 1(a), a core-shell structure having an adjustable void space inside a shell 1 comprises a core 2 made of a nano fine particle and a shell 4 coating the core 2 via a void space inside a shell 3. The size of the void space inside a shell 3 is controlled to an arbitrary size depending on the field of application. Though not illustrated in the figure, the shell 4 has numerous micropores (holes of about several angstrom diameter).

FIG. 1(b) shows another embodiment of a core-shell structure having an adjustable void space inside a shell of the present invention, and a core-shell structure 5 differs from that of FIG. 1(a) 1 in having an opening of the predetermined shape in the shell 4, that is, a shell hole 6.

The core 2 may be anything so long as a solid having a photoabsorption edge, and preferably a metal chalcogenide semiconductor, for example, CdS (cadmium sulfide). The core diameter is controlled to the predetermined value from several tens of nm to 1 nm. The shell 4 may be anything so long as a non-photoetchable material, and, for example, $SiO_x$ (silica, $0<x$). The diameters of the shell 4 and the shell hole 6 are controlled to the desired values from several tens of nm to 1 nm depending on the field of application. The void space inside the shell 3 is controlled to the predetermined value from several tens of nm to 1 nm.

The core-shell structure having the adjustable void space inside the shell of the present invention can be used, for example, in the field of application as shown below.

The core-shell structure having the adjustable void space inside the shell 1 has a micropore in the shell 4, and selectively passes specific metal ions. By utilizing this function, specific metals can be deposited in the void space inside the shell 3. Since the void space inside the shell 3 is controlled to the desired size, the metal fine particles of a certain shape with uniform size can be formed. For example, utilized for the formation of catalytic metal fine particles such as vanadium, it can form in large quantity catalytic metal fine particles of the shape for the highest catalytic activity in high accuracy.

Also since the core-shell structure 5 having the adjustable void space inside the shell 3 has the shell hole 6 of the controlled shape in the shell 4, it can adsorb selectively a specific material having a specific structure via the shell hole 6 and the void space inside the shell 3. And thereby the compounds, which could not be prepared by conventional preparation methods, can be prepared by using the material composing the core 2 as a catalyst or a photocatalyst to react adsorbed materials, or by reacting adsorbed materials with the material composing the core 2.

Next, a structure having as a constituent a core-shell structure with an adjustable void space inside a shell is explained.

Figure 2:
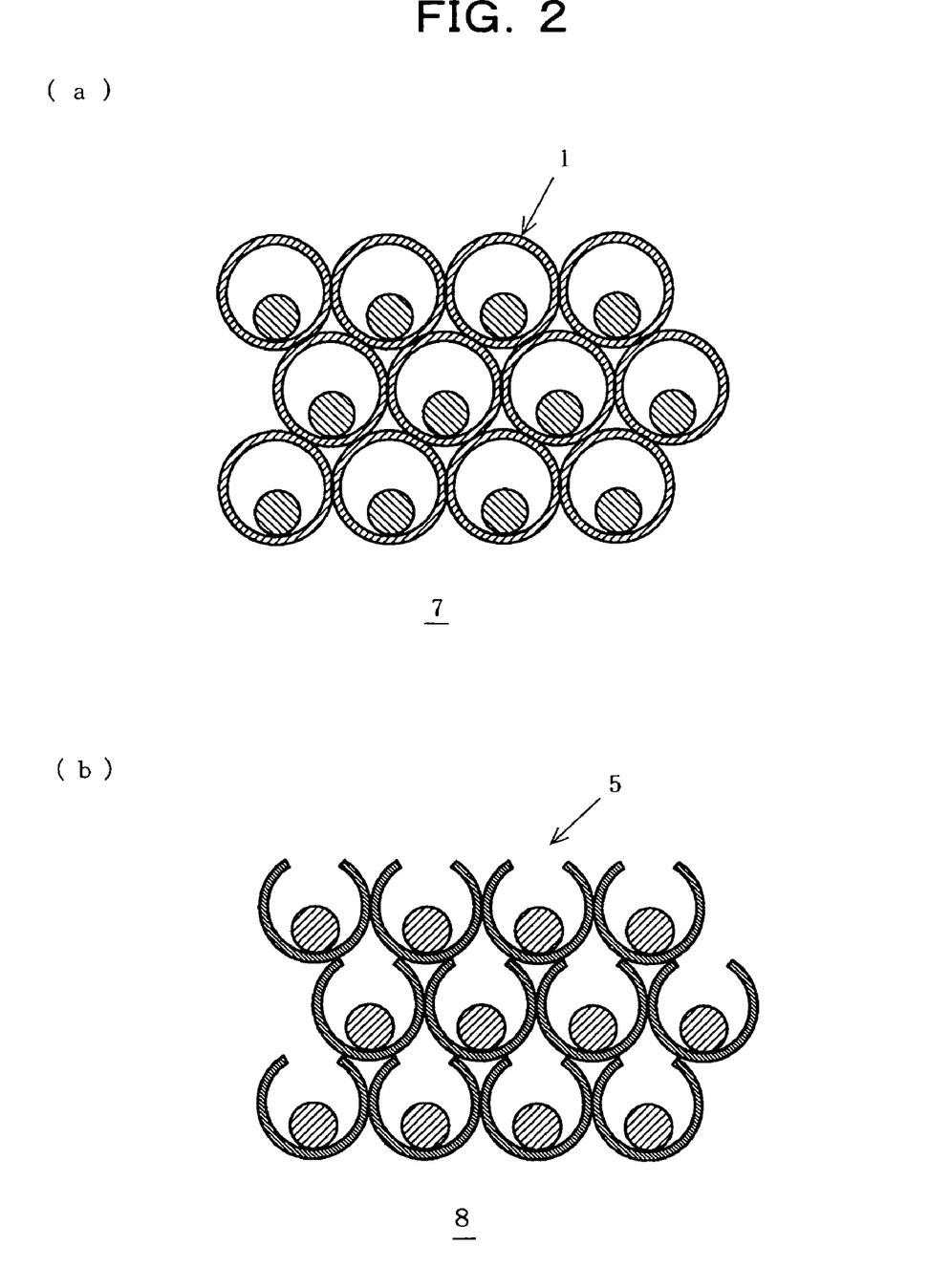
FIG. 2 is an illustrative cross sectional view showing a structure having as a constituent a core-shell structure with an adjustable void space inside a shell of the present invention.

FIG. 2 is a illustrative cross sectional view showing a structure having as a constituent a core-shell structure with an adjustable void space inside a shell in accordance with the present invention, and FIG. 2(*a*) shows a structure 7 having as a constituent the core-shell structure 1 shown in FIG. 1(*a*), and FIG. 2(*b*) shows a structure 8 having as a constituent the core-shell structure 5 shown in FIG. 1(*b*). A structure 7 or 8 having as a constituent a core-shell structure with an adjustable void space inside a shell of the present invention is a structure in which a plurality of core-shell structure 1 or 5 shown in FIG. 1 are aligned regularly. In the figure, the most densely packed structure is shown, but not limited to this structure. Various shapes of structure are possible. According to the structure 7 or 8, for example, in the specific photocatalytic reactions consisting of complex reaction processes, a substrate adsorbed selectively on the core-shell structure is regularly aligned based on the shape of the structure 7 or 8, thereby the reaction field optimum for photocatalytic reaction can be formed.

Figure 3:
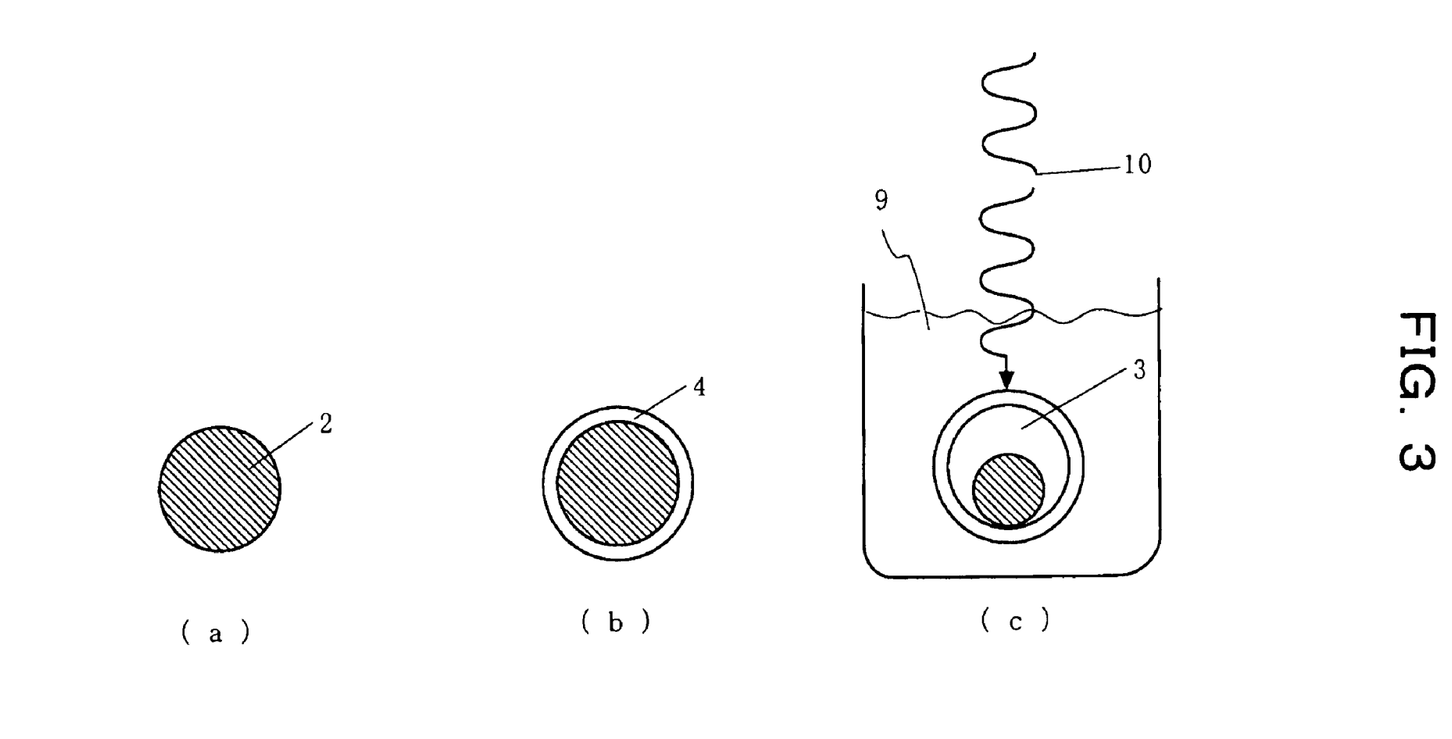
FIG. 3 is a view showing a method of preparation of a core-shell structure having an adjustable void space inside a shell of the present invention.

Next, a method of preparation of a core-shell structure having an adjustable void space inside a shell of the present invention is explained referring to FIG. 3. Here during the explanation, FIGS. 4-6 will be referred. FIG. 3 is a view showing a process of a method of preparation of a core-shell structure having an adjustable void space inside a shell of the present invention.

First of all, as shown in FIG. 3(*a*), a photoetchable fine particle of desired diameter 2 is prepared. The fine particle 2 may be formed, for example, by liquid phase precipitation method or CVD (chemical vapor deposition) method, or by other methods.

Next, as shown in FIG. 3(*b*), the surface of the fine particle 2 is coated with a shell 4 made of a non-photoetchable material. In this case, when the structure 1 as shown in FIG. 1(*a*) is to be formed, the thickness of a shell 4 is made sufficiently thin so that a micropore is to be left.

And then, as shown in FIG. 3(*c*), a void space 3 is formed by size-selective photoetching described below.

Figure 4:
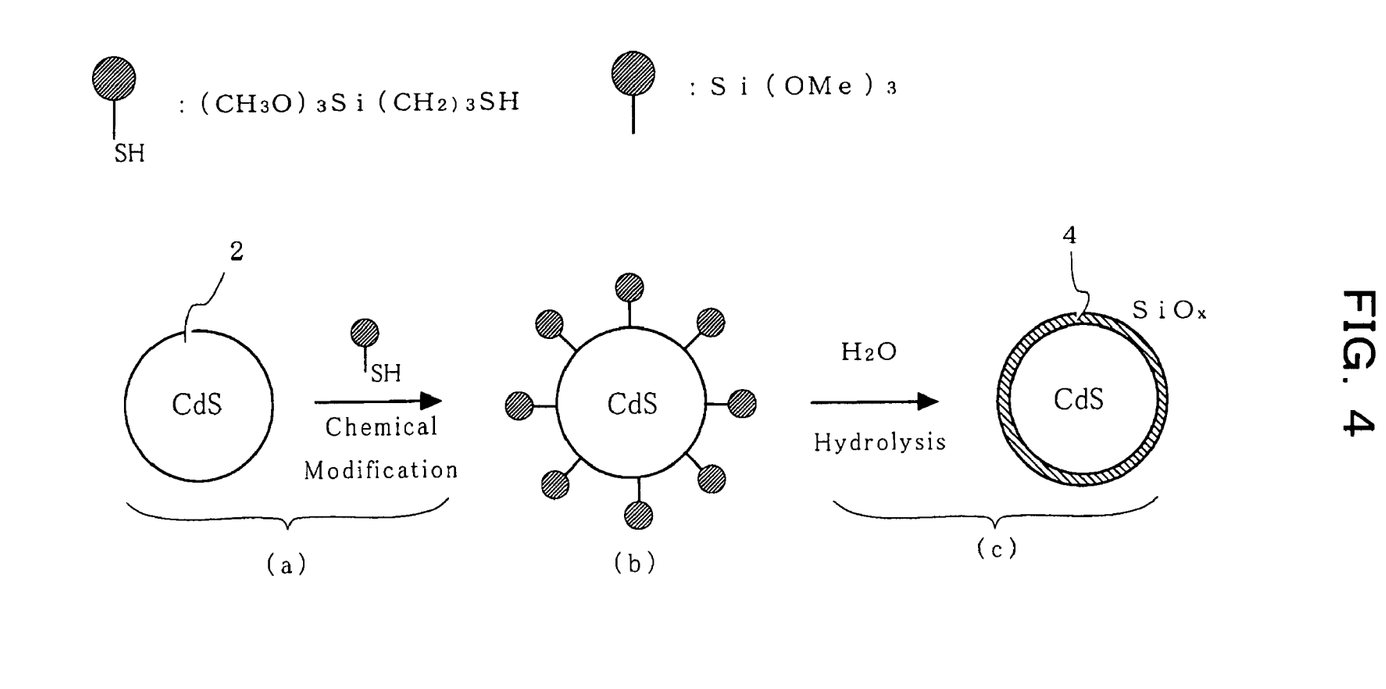
FIG. 4 is a view showing illustratively processes to coat the core made of CdS fine particle with the shell made of SiOx of the present invention.

In case that, for example, the fine particle 2 is a metal chalcogenide semiconductor, a method shown below can be used. An explanation is made by taking the case of cadmium sulfide (CdS) as an example. FIG. 4 is a view showing illustratively processes to coat the core made of CdS fine particle with the shell made of SiOx.

As shown in FIG. 4(*a*), by chemically modifying the surface of CdS fine particle 2 using 3-mercaptopropyltrimethoxysilane ((CH$_3$O)$_3$Si(CH$_2$)$_3$SH) which is one of thiol compounds, trimethoxysilyl group (Si(OMe)$_3$)- is introduced onto the surface of CdS fine particle 2 as shown by (Si(OMe)$_3$-/CdS) in FIG. 4(*b*). Since 3-mercaptopropyltrimethoxysilane is the thiol compound, it can be bonded to CdS via S of the thiol compound. Next, by hydrolyzing trimethoxysilyl group (Si(OMe)$_3$), a core-shell structure is formed with CdS fine particle 2 as the core, and silica (SiOx) monomolecular layer as the shell 4 as shown by (SiOx—/CdS) in FIG. 4(*c*). Since the trimethoxysilyl group introduced onto the surface contains Si as a constituent element, the SiOx film can be formed by hydrolysis. The SiOx film is not photoetchable.

Figure 5:
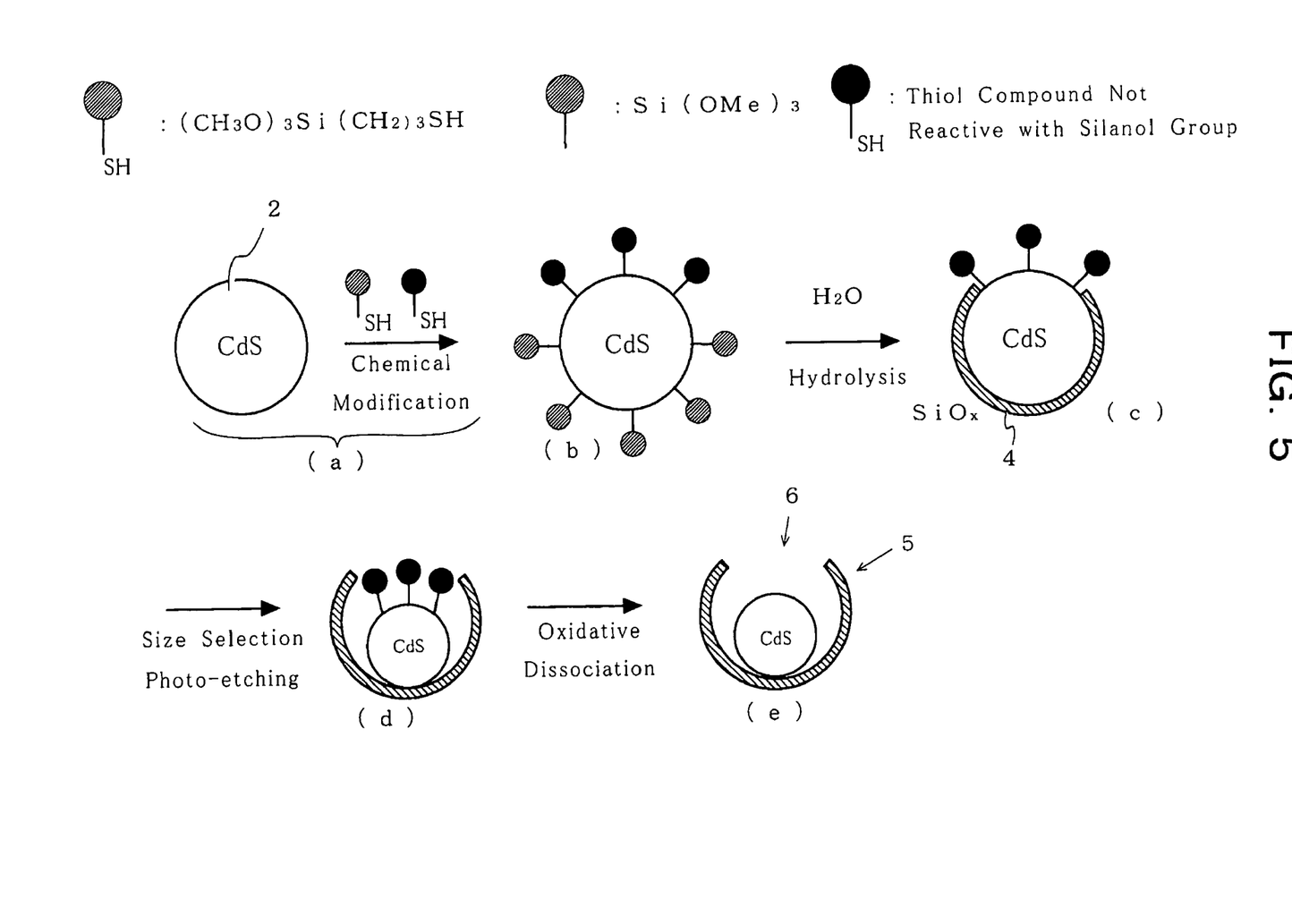
FIG. 5 is a view showing illustratively processes to form a shell hole in the shell of the core-shell structure made of CdS core and SiOx shell of the present invention.

Also, the shell hole shown in FIG. 1(*b*) is formed by a method shown below. FIG. 5 is a view showing illustratively processes to form a shell hole in the shell of the core-shell structure made of CdS core and SiOx shell.

As shown in FIG. 5(*a*), upon chemical modification, a thiol compound such as alkylthiol, that is not reactive with a silanol group such as trimethoxysilyl group, is mixed with 3-mercaptopropyltrimethoxysilane. And these thiol compounds are competitively bonded to the particle surface, thereby the aggregate of alkylthiol compound is formed as shown in FIG. 5(*b*). Upon hydrolysis, the silanol group forms the SiOx shell 4, but the aggregate of alkylthiol compound is left over as it is, as shown in FIG. 5(*c*). Next, the CdS fine particle is photoetched with its diameter being controlled by a size-selective photoetching method explained below, and an adjustable void space inside a shell is formed between the core 2 and the shell 4 as shown in FIG. 5(*d*), followed by a formation of shell hole 6, as shown in FIG. 5(*e*), by oxidative dissociation of the aggregate of alkylthiol compound.

Also, a core-shell structure having an adjustable void space inside a shell that can be dissolved in water or organic solvents is formed by the method shown below.

Figure 6:
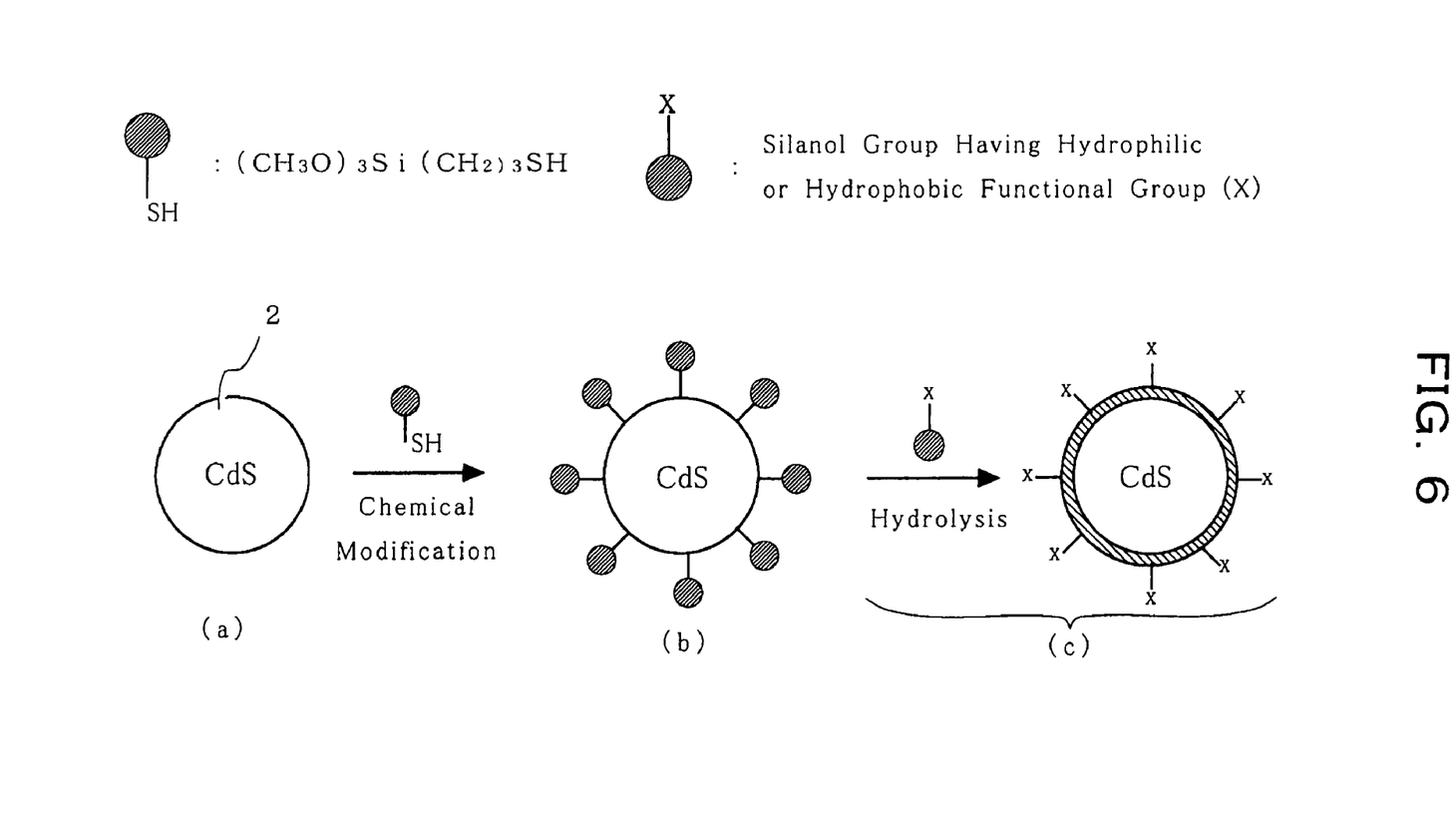
FIG. 6 is a view showing illustratively processes to form a core-shell structure made of CdS core and SiOx shell dissolved in either water or organic solvents of the present invention.

FIG. 6 is a view showing illustratively processes to form a core-shell structure made of CdS core and SiOx shell dissolved in either water or organic solvents of the present invention.

As shown in FIGS. 6(*a*) and (*b*), after the surface of a CdS fine particle 2 is chemically modified by the same method as shown in FIG. 4, it is hydrolyzed as shown in FIG. 6(*c*). After this hydrolysis, the silica monomolecular layer of the surface of a CdS fine particle 2 can be further chemically modified (X—R—(SiOx)—/CdS) by adding the alkylsilane compound having an alkyl group which possesses various functional groups (X) such as alkyl trimethoxysilane (X—R—Si(OMe)$_3$). And the surface characteristics of CdS fine particle 2 can be controlled by the kind of the functional groups (X) possessed by the alkyl group. For example, by using n-octadecyltrimethoxysilane as an alkylsilane compound, a core-shell structure soluble homogeneously in toluene, dimethylformamide, chloroform, carbon tetrachloride, or the like. A water-soluble core-shell structure can also be obtained by using the alkylsilane possessing as a functional group X such as carboxyl, quaternary amine, amino, sulfonic, or hydroxyl group, or the like.

Next as shown in FIG. 3(*c*), a void space inside a shell 3 of a core-shell structure is controlled and formed by irradiating the light of certain wavelength to the fine particle 2 in a photoetching solution 9. By irradiating a light 10 having a wavelength of absorption edge of the fine particle 2, the fine particle 2 absorbs the light 10, and causes photoetching reaction, and the surface of the fine particle 2 is photocorroded into photoetching solution and its diameter is gradually reduced. When the diameter of the fine particle 2 is reduced to about 10 nm or less, the quantum size effect becomes noticeable, and as the diameter of the fine particle 2 becomes still smaller, the wavelength of absorption edge shifts to the shorter wavelength region. And when the wavelength of absorption edge becomes shorter than the wavelength of the irradiated light 10, the photoetching reaction terminates and the diameter of the fine particle 2 stays at a certain value. By thus selecting the wavelength of the irradiated light 10, the diameter of the fine particle 2 is controlled. Consequently, by calculating the diameter of the fine particle 2 corresponding to the predetermined void space 3, and irradiating the light 10 of wavelength corresponding to said particle diameter, the core-shell structure 1 or 5 having the adjustable void space inside a shell 3 can be prepared.

Here, the control method of a void space inside a shell of the present invention utilizes the size-selective photoetching method that was proposed by the present inventors (See References: J. Electrochem. Soc., 145, 1964-1968 (1998), Chem. Lett., 379-380 (1999), and J. Phys. Chem. B, 105, 6838-6845 (2001)). This size-selective photoetching method is such that utilizes the phenomena that the energy gap of a semiconductor nanoparticle increases by the quantum size effect as the particle diameter decreases, and that a metal chalcogenide semiconductor is oxidatively corroded by photo irradiation in the presence of dissolved oxygen. This method selectively photoexcites and photoetches the semiconductor nanoparticles of large diameter only by irradiating semiconductor nanoparticles having wide diameter distribution range with the monochromatic light of the wavelength shorter than that of its absorption edge, thereby the particle diameter is arranged to smaller semiconductor nanoparticles.

Next, an explanation is made of a method of preparation of a structure having as a constituent a core-shell structure with an adjustable void space inside a shell of the present invention shown in FIG. 2.

The plurality of core-shell structures 1 or 5 having the adjustable void space inside the shell as shown in FIG. 1 are organized by self-organization, thereby a structure of desired shape is prepared.

The self-organization methods shown below are applicable.

(1) Three Dimensional Organization Method

The core-shell structures 1 or 5 are dispersed in solvent, the solvent is gradually evaporated, and the self-organization is effected by the Van der Waals force among core-shell structures (See Reference: Science, 270, 1335-1338 (1995.).

(2) Two Dimensional Organization Method

The two dimensional particle film formed by spreading core-shell structures 1 or 5 on the gas-liquid interface are compressed to be organized (See Reference: Langmuir, 15, 1853-1858 (1999).).

(3) One Dimensional Organization Method

Using DNA as a template, the core-shell structure 1 or 5 is arranged along DNA (See Reference: J. Phys. Chem. B, 103, 8799-8803 (1999).).

Next, these self-organized structures are thermally treated, chemically treated with such as bridging molecules, or shells are bonded by direct reaction of shells, thereby the structures are stabilized. In case of the SiOx shell, for example, structures can be stabilized by bridging between SiOx thin films with tetraethoxysilane.

Here, the explanation mentioned above described the preparation method using the core-shell structure 1 or 5 having the adjustable void space inside the shell. However, as shown in FIG. 3(b), after preparing the structure of predetermined shape by the above-mentioned method using a structure before an adjustable void space inside a shell is formed, a desired void may be formed by the size-selective photoetching method.

Next, an example is explained.

After the trimethoxysilyl group (($CH_3O)_3Si$—) was introduced onto the nanoparticle surface by chemically modifying the cadmium sulfide (CdS) nanoparticle surface using 3-mercaptopropyltrimethoxysilane (($CH_3O)_3Si(CH_2)_3SH$) which was one of thiol compounds, the surface of cadmium sulfide (CdS) nanoparticle was coated with a silica layer by hydrolyzing the trimethoxysilyl group, and the bridging was effected with Si—O—Si bond between shells, thereby a structure having as a constituent a core-shell structure was formed. By irradiating the thus obtained core-shell structure with monochromatic light (457.9 nm), size-selective photoetching was applied to the cadmium sulfide (CdS) nanoparticle inside a core-shell structure, the diameter of a cadmium sulfide (CdS) nanoparticle is reduced to about 2.8 nm, thereby a core-shell structure having an adjustable void space inside a shell was prepared.

Figure 7:
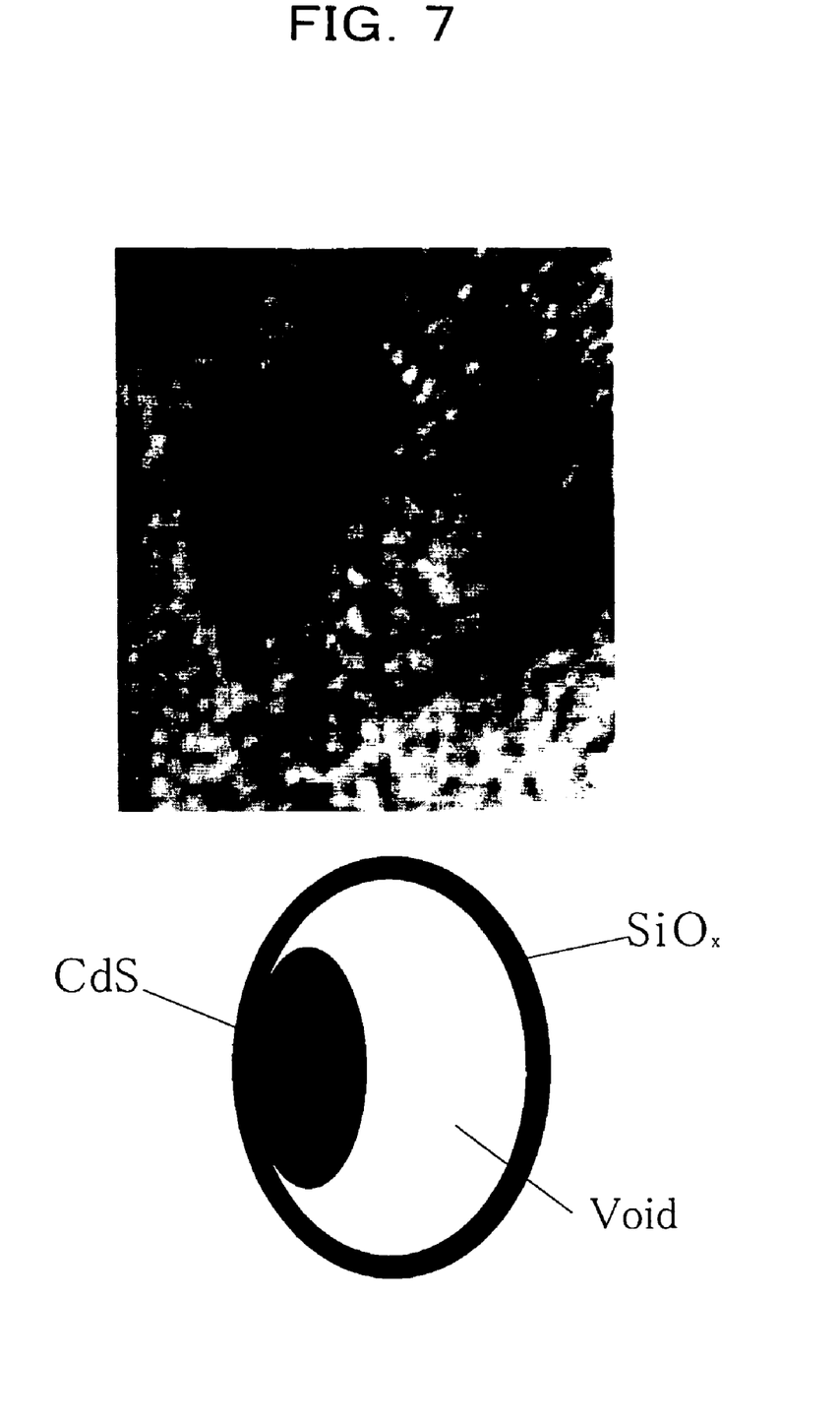
FIG. 7 is a view of a transmission electron microscopic image of the structure having as the constituent the core-shell structure with the adjustable void space inside a shell prepared in the present example and its illustration.

FIG. 7 is a view of a transmission electron microscope image of the structure having as the constituent the core-shell structure with the adjustable void space inside a shell prepared in the present example.

In the figure, the black coagulating portion is the cadmium sulfide (CdS) nanoparticle as the core, and the black ring-like portion around it is silica (SiOx) as the shell, and the white portion in between is a void space inside the shell.

As is obvious from the figure, the core-shell structure having the adjustable void space inside the shell was formed.

INDUSTRIAL APPLICABILITY

As is understood from the explanation described above, a core-shell structure having an adjustable void space inside a shell and a structure having said core-shell structure as a constituent and a method of preparation of the same can be provided according to the present invention. The preparation of new catalysts which could not be prepared by the conventional art, and the preparation of the catalysts of remarkably high efficiency compared with conventional catalysts are made possible, and it is quite useful if used as the precursor to prepare the nanomaterial required for nanodevices.

What is claimed is:

1. A core-shell structure having a void space of predetermined size inside a shell, comprising:
    a core comprising nanoparticles, said core is a photoetchable solid;
    a shell coating said core, said shell is a non-photoetchable material; and
    a void space defined by a space between said core and said shell,
    wherein said predetermined size of said void space is 1 nm to about 50 nm in diameter.

2. The core-shell structure having a void space of predetermined size inside a shell as set forth in claim 1, wherein said shell has an opening with a predetermined shape.

3. The core-shell structure having a void space of predetermined size inside a shell as set forth in claim 1, wherein said core comprising said photo etchable solid is etchable by irradiating a light in a photoetching solution, and said solid comprises a metal, a metal oxide, a semiconductor, or a polymer having a photoabsorption edge.

4. The core-shell structure having a void space of predetermined size inside a shell as set forth in any one of claims 1-3, wherein said core is a semiconductor particle of metal chalcogenide, and said shell is a film having silicon-oxygen bond in its structure.

5. The core-shell structure having a void space of predetermined size inside a shell as set forth in claim 4, wherein said semiconductor particle of metal chalcogenide is CdS (cadmium sulfide), and said film having silicon-oxygen bond in its structure is SiOx (silicon oxide, 0<x).

6. A structure having as a constituent a core-shell structure with a void space of predetermined size inside a shell, having as a constituent:
the core-shell structure having a void space of predetermined size inside a shell as set forth in any one of claims 1-3.

7. A core-shell structure having a void space of predetermined size inside a shell, comprising:
a core comprising nanoparticles, said core is a photoetchable solid;
a shell containing said core, said shell is a non-photoetchable material; and
a void space defined by a space between said core and said shell,
wherein said void space is of said predetermined size and said shell has an opening with a predetermined shape.

8. The core-shell structure having a void space of predetermined size inside a shell, as set forth in claim 7, wherein said core comprising said photoetcable solid, comprises a metal, a metal oxide, a semiconductor, or a polymer having a photoabsorption edge.

9. The core-shell structure having a void space of predetermined, size inside a shell, as set forth in claim 7 or 8, wherein said core is a semiconductor particle of metal chalcogenide, and said shell is a film having silicon-oxygen bond in its structure.

10. The core-shell structure having a void space of predetermined size inside a shell, as set forth in claim 9, wherein said semiconductor particle of metal chalcogenide is CdS (cadmium sulfide), and said film having silicon-oxygen bond in its structure is SiOx (silicon oxide, 0<x).

11. A structure having as a constituent a core-shell structure with
a void space of predetermined size inside a shell, having as a constituent:
core-shell structure having a void space of predetermined size inside a shell as set forth in claim 7 or 8.

12. A core-shell structure having a void space of predetermined size inside a shell, comprising:
a core made of a nano fine particle, said core is a photoetchable solid; and
a shell having a diameter of 1 nm to about 50 nm coating said core via a void space, said shell is a non-photoetchable material;
wherein said void space is controlled to said predetermined size by controlling the particle diameter of said core.

13. The core-shell structure having a void space of predetermined size inside a shell as set forth in claim 12, wherein said core comprising said photoetcable solid, comprises a metal, a metal oxide, a semiconductor, or a polymer having a photoabsorption edge.

14. The core-shell structure having a void space of predetermined size inside a shell as set forth in claim 12 or 13, wherein said core is a semiconductor particle of metal chalcogenide, and said shell is a film having silicon-oxygen bond in its structure.

15. The core-shell structure having a void space of predetermined size inside a shell as set forth in claim 14, wherein said semiconductor particle of metal chalcogenide is CdS (cadmium sulfide), and said film having silicon-oxygen bond in its structure is SiOx (silicon oxide, 0<x).

16. A structure having as a constituent a core-shell structure with a void space of predetermined size inside a shell, having as a constituent:
core-shell structure having a void space of predetermined size inside a shell as set forth in claim 12 or 13.

17. A core-shell structure having a void space of predetermined size inside a shell, comprising:
a core made of a nano fine particle, said core is a photoetchable solid; and
a shell having a diameter of 1 nm to about 50 nm coating said core via a void space, said shell is a non-photoetchable material;
wherein said void space is controlled to said predetermined size by controlling the particle diameter of said core, and further said shell has a shell hole larger than a micropore of said shell.

18. The core-shell structure having a void space of predetermined size inside a shell as set forth in claim 17, wherein said core comprising said photoetcable solid, comprises a metal, a metal oxide, a semiconductor, or a polymer having a photoabsorption edge.

19. The core-shell structure having a void space of predetermined size inside a shell as set forth in claim 17 or 18, wherein said core is a semiconductor particle of metal chalcogenide, and said shell is a film having silicon-oxygen bond in its structure.

20. The core-shell structure having a void space of predetermined size inside a shell as set forth in claim 19, wherein said semiconductor particle of metal chalcogenide is CdS (cadmium sulfide), and said film having silicon-oxygen bond in its structure is SiOx (silicon oxide, 0<x).

21. A structure having as a constituent a core-shell structure with a void space of predetermined size inside a shell, having as a constituent:
the core-shell structure having a void space of predetermined size inside a shell as set forth in claim 17 or 18.

22. A method of preparation of a core-shell structure having a void space of predetermined size inside a shell, wherein:
a particle comprising a photoetchable solid is prepared while its particle diameter is controlled;
a particle surface is chemically modified with a chemical material containing a component element capable of bonding to said particle surface and a group containing a component element of non-photoetchable oxide, thereby said group is introduced into said particle surface;
a coating film made of said oxide is formed by hydrolyzing said group containing a component element of non-photoetchable oxide;
a core-shell structure is formed with said particle as a core, and said coating film as a shell;
said core-shell structure is photo-irradiated in a photoetching solution of a predetermined wavelength; and
a void space of predetermined size is formed inside the core-shell structure;
wherein said predetermined size of said void space is 1 nm to about 50 nm in diameter.

23. The method of preparation of a core-shell structure having a void space of predetermined size inside a shell as set forth in claim 22, wherein, upon said chemical modification, said coating film is formed by competitively bonding said group containing a component element of said coating film and a compound not reactive with said group containing a component element of said coating film to said particle surface, and the opening of the desired shape is formed in said shell by oxidative dissociation of said compound, after forming a void space of predetermined size inside said core-shell structure.

24. The method of preparation of a core-shell structure having a void space of predetermined size inside a shell as set forth in claim 23, wherein:
said particle consisting of a photoetchable solid is CdS;
said element bonding to the particle surface is S;
said component element of non-photoetchable oxide is Si;
said group is $(CH_3O)_3Si$ group containing Si;
said chemical material is $(CH_3O)_3Si(CH_2)_3SH$; and
said compound not reactive with the group containing the component element of said coating film is a thiol compound.

25. The method of preparation of a core-shell structure having a void space of predetermined size inside a shell as set forth in claim 24, wherein:
said compound not reactive with the group containing the component element of said coating film is an alkylthiol.

26. The method of preparation of a core-shell structure having a void space of predetermined size inside a shell as set forth in claim 22, wherein: after said hydrolysis and further chemical modification by adding a chemical material having a hydrophilic or hydrophobic group, it is made soluble either in water or in organic solvent.

27. The method of preparation of a core-shell structure having a void space of predetermined size inside a shell as set forth in claim 26, wherein:
said particle comprising a photoetchable solid is CdS;
said element bonding to the particle surface is S;
said component element of non-photoetchable oxide is Si;
said group is $(CH_3O)_3Si$ group containing Si;
said chemical material is $(CH_3O)_3Si(CH_2)_3SH$;
said chemical material having a hydrophilic group is an alkyl silane containing either carboxylic, quatemary ammonium, amino, sulfonic acid, or hydroxyl group; and
said chemical material having a hydrophobic group is an n-octadecyltrimethoxysilane.

28. The method of preparation of a core-shell structure having a void space of predetermined size inside a shell as set forth in claim 22, wherein:
said particle comprising a photoetchable solid is CdS (cadmium sulfide);
said element bonding to the particle surface is S (sulfur);
said component element of non-photoetchable oxide is Si (silicon);
said group is $(CH_3O)_3Si$ (trimethoxysilyl) group containing Si,
said chemical material is $(CH_3O)_3Si(CH_2)_3SH$ (3-mercapto-propyl trimethoxysilane); and
said coating film formed by hydrolysis is SiOx (silicon oxide, 0<x).

29. The method of preparation of a core-shell structure having a void space of predetermined size inside a shell as set forth in any one of claims 22-27, wherein, upon said formation of a void space of predetermined size inside the shell in the core-shell structure by photo-irradiation with a predetermined wavelength, the particle diameter is controlled by photoetching with the light of wavelength of absorption edge corresponding to said predetermined particle diameter.

* * * * *